United States Patent [19]

Gruber

[11] Patent Number: 4,766,724

[45] Date of Patent: Aug. 30, 1988

[54] ARCJET POWER SUPPLY AND START CIRCUIT

[75] Inventor: Robert P. Gruber, North Olmsted, Ohio

[73] Assignee: The United States of America as represented by the Administrator of the National Aeronautics and Space Administration, Washington, D.C.

[21] Appl. No.: 60,200

[22] Filed: Jun. 10, 1987

[51] Int. Cl.[4] .......... F02K 11/00

[52] U.S. Cl. .......... 60/203.1; 219/383; 363/97

[58] Field of Search .......... 60/203.1, 202; 219/130.32, 383, 121 EA; 363/97, 79, 80

[56] References Cited

U.S. PATENT DOCUMENTS

| | | | |
|---|---|---|---|
| 2,850,662 | 3/1958 | Gilruth et al. | 313/231 |
| 3,016,693 | 1/1962 | Jack et al. | 60/203.1 |
| 3,149,459 | 7/1959 | Ulam . | |
| 3,304,719 | 2/1967 | Ducati | 60/203.1 |
| 3,359,734 | 11/1965 | Ferrie et al. | 60/203.1 |
| 3,447,322 | 6/1969 | Mastrup | 60/203.1 |
| 3,775,585 | 11/1973 | Okada | 219/130.32 |
| 4,143,314 | 3/1979 | Gruber | 323/288 |
| 4,301,355 | 11/1981 | Kimbrough et al. | 219/130.32 |
| 4,523,429 | 6/1985 | Bingley | 60/203.1 |
| 4,548,033 | 10/1985 | Cann | 60/203.1 |
| 4,614,998 | 9/1986 | Rilly | 363/97 |
| 4,638,149 | 1/1987 | Wessel et al. | 323/251 |
| 4,703,409 | 10/1987 | Spreen | 363/45 |

*Primary Examiner*—Donald E. Stout
*Attorney, Agent, or Firm*—Gene E. Shook; John R. Manning

[57] ABSTRACT

A dc power supply for spacecraft arcjet thrusters has an integral automatic starting circuit and an output averaging inductor. The output averaging inductor, in series with the load, provides instantaneous current control, and ignition pulse and an isolated signal proportional to the arc voltage. A pulse width modulated converter, close loop configured, is also incorporated to give fast response output current control.

6 Claims, 1 Drawing Sheet

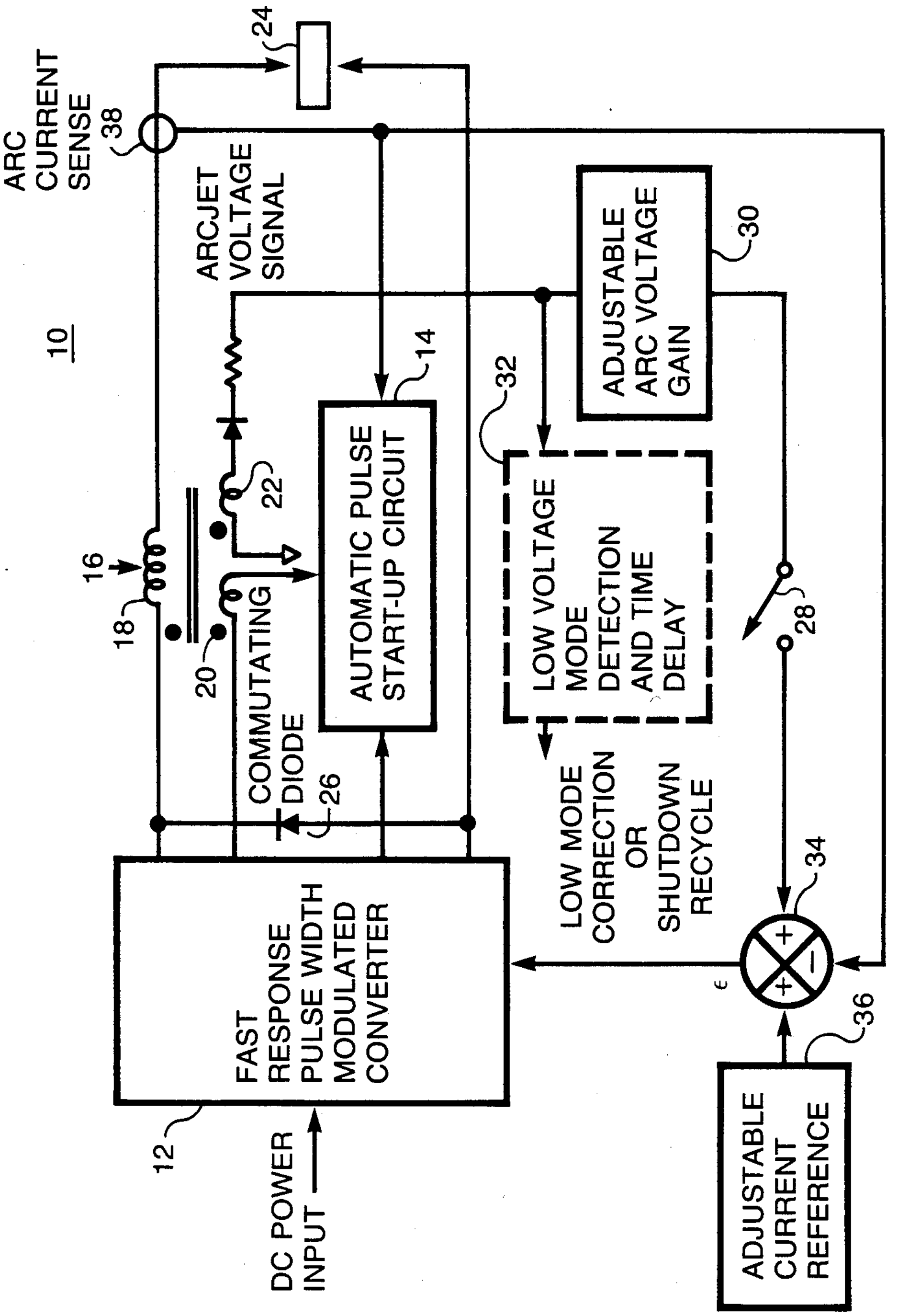
10
ARC CURRENT SENSE
38
24
ARCJET VOLTAGE SIGNAL
ADJUSTABLE ARC VOLTAGE GAIN
30
16
18
20
22
14
AUTOMATIC PULSE START-UP CIRCUIT
32
LOW VOLTAGE MODE DETECTION AND TIME DELAY
28
COMMUTATING DIODE
26
LOW MODE CORRECTION OR SHUTDOWN RECYCLE
34
FAST RESPONSE PULSE WIDTH MODULATED CONVERTER
12
DC POWER INPUT
ε
36
ADJUSTABLE CURRENT REFERENCE

ARCJET POWER SUPPLY AND START CIRCUIT

ORIGIN OF THE INVENTION

The invention described herein was made by an employee of the U.S. Government and may be manufactured and used by or for the Government for governmental purposes without the payment of any royalties theron or therefor.

TECHNICAL FIELD

This invention relates generally to power supplies. The invention is particularly directed to a power supply and start circuit for providing virtual instantaneous nondamaging start up and steady state control of an arcjet thruster.

Arcjets operate by heating a gas with an electric arc and expanding the heated gas through a nozzle to provide thrust. The arc discharge voltage decreases with increasing current. This arc characteristic requires some form of current limiting to prevent the thruster from being destroyed. Furthermore, some means must be provided to initiate the arc discharge. Previously, arcjets were powered in the laboratory using techniques with many disadvantages. One method used a high voltage power supply with a ballast resistor in series with the thruster arc. This wastes power and does not provide a true constant current source. Another open loop technique that does not have waste power was developed two decades ago and incorporates magnetic amplifiers. Power efficiency is inherently low and no startup circuits are included.

There are presently five basic methods for starting arcjets. Each has advantages and disadvantages. A mechanical method is used that momentarily brings electrodes together. Further, a method wherein a gaseous composition is temporarily changed can start the thruster. Another method adjusts the propellant gas pressure until a paschen discharge is established. Yet another method maintains a high voltage across the electrodes (600 to 2000 V) until the arc starts. Still further, a technique can be used wherein the discharge is initiated using radio frequency energy.

It is therefore the object of this invention to provide a high efficiency and reliable power supply for spacecraft dc arcjet thrusters.

Another object of the invention is to provide a power supply which maintains constant current for an instantaneous voltage change.

Still another object of the invention is to provide a power supply that is light weight, inexpensive, and has high power efficiency.

Yet another object of the invention is to provide a power supply having an integral start circuit.

BACKGROUND ART

U.S. Pat. No. 2,850,662 to Gilruth et al is directed to an electrical arc powered jet. The invention produces the combination of high temperature, high speeds, long running time and adaptability to liquid air, gaseous air, and other jet materials, to the use of high arc chamber pressure and to the use of either ac or dc electric power.

U.S. Pat. No. 3,149,459 to Ulan is directed to an electric arc type propulsion motor. Propulsion is based on the transformation of electric energy into kinetic energy and the type of motor depends on the process employed to bring about this transformation. Working fluid is supplied to the surface of an electrode to the interior or along the surface of the electrode. The working fluid is transformed abruptly into vapor which is superheated and ejected at a high velocity.

U.S. Pat. No. 3,359,734 to Ferrie et al discloses an. electrothermal propulsion unit of an electric arc type having a hollow first electrode and a second electrode having at least a portion situated within and extending in spaced relationship to one end portion of the first electrode to define an arc chamber therebetween. Heat exchange cooperate with the other end portion of the first electrode in direct contact and heat exchange relationship therewith. An intermediate chamber surrounds one end portion of the first electrode and connects the passage and the arc chamber so tbat propellant can be supplied through the passage and the intermediate chamber to the arc chamber and ejected from the arc chamber through a nozzle.

U.S. Pat. No. 4,523,429 to Bingley is directed to a electrothermal hydrazine thruster which passes hydrazine through a catalyst bed and an augmentation heater. A load resistance is coupled in series with the heating element to reduce the current through the electrical circuit including the heating element to a safe level. A switch is coupled across the load resistance and is closed bypassing the load resistance when the heating element heats up and increases its resistance value to a value that can be tolerated by the battery circuit.

U.S. Pat. No. 4,548,033 to Cann is directed to a thruster apparatus applicable to an environment of a space vehicle or satellite. The device utilizes a unique configuration of passageways to convert the propellant to a location adjacent to an electrical arc forming device. The propellant, heated thereby, then travels out a nozzle section of the thruster to thereby produce thrust.

DISCLOSURE OF THE INVENTION

According to the present invention a dc power supply for arcjet thrusters has a closed loop controlled constant current source with an integral automatic starting circuit. The power supply circuit comprises a high frequency pulse width modulated power converter to give fast response output current control. An output averaging inductor is also incorporated which provides instantaneous current control. The resultant power electronic system has high power efficiency, is reliable and conforms to typical spacecraft electrical specifications.

BRIEF DESCRIPTION OF THE DRAWING

The foregoing as well as other objects, features and advantages of this invention will become more apparent in the following detailed description when taken in conjunction with the appended figure in which is shown a functional diagram of an arcject and start circuit.

BEST MODE FOR CARRYING OUT THE INVENTION

Turning now to the figure, there is shown a functional diagram of a power supply circuit 10 for an arcjet. The power supply circuit 10 has a PWM converter 12. Also, an integral automatic high voltage pulse starting circuit 14 and an commutated inductor 16 having three windings galvanically isolated on a magnetic core are incorporated in the power electronic circuit 10. A primary winding 18 is adapted to provide virtual constant current to the arcjet thruster. A secondary winding 20 enables pulse breakdown for arcjet startup. Finally, a tertiary winding 22, serially connected with a resistor of about 2000 ohms and a signal level blocking diode, provides a signal proportional to the arcjet thruster voltage 24.

The high frequency PWM converter 12 is closed loop configured to give fast response current control. Arc current is controlled using a conventional control loop designed to provide fast response control of arc current. In the preferred embodiment, the response time for a step change of 2:1 in load 24 resistance is less than about 500 μsec. Current change for a 2:1 step change in load 24 resistance is less than about 3 A for a 10 A load. A portion of the control loop is implemented by developing a galvanically isolated signal proportional to arc current using current sensor 26. Further, the voltage signal approximately proportional to actual arc current is subtracted from the voltage signal proportional to desired arc current supplied by adjustable current reference 28. Subtraction is done using a standard error amplifier 30 that is frequency compensated using conventional techniques to provide fast current control as well as control loop stability.

The commutated inductor 16 in series with the load 24 serves the three roles of providing (1) instantaneous current control, (2) a high voltage ignition pulse, and (3) an isolated signal proportional to arc voltage. Combining functions in the inductor 16 saves using another heavy pulse transformer and separate signal isolation circuitry.

Further, the ignition pulse is developed by charging the inductor 16 from the supply through a separate low voltage winding. When the current in the low voltage winding is interrupted (with a transistor switch) the inductor 16 magnetic field collapses and a high voltage pulse is producsd. The power supply circuit 10 initiates the pulse at a predetermined rate of about four times each second until arc current is detected. Then the pulser, which incorporates inductor 16 and pulse starting circuit 14, is automatically turned off. One advantage of this method of ignition is that the maximum initial pulse current is limited to a pre-selected value so unnecessary electrode erosion is eliminated. For overvoltage protection, the inductor voltage is clamped to a pre-determined value using the low voltage winding. This prevents over-voltage if the thruster 24 does not start and also eliminates voltage transients should the arc extinguish.

Furthermore, during the part of the cycle when the PWM converter 12 output is zero, the commutated inductor 16 delivers energy to the arcjet thruster or load 24. Concurrently, the arc load voltage appears across the inductor 16 and commutating diode 32. A separate isolated Faraday shielded winding and small diode are used to develop a signal proportional to arc voltage. This signal can be used to perform any number of functions. It could be used to detect low mode and to provide arc voltage telemetry. It can be used in conjunction with the control system to provide a positive slope output characteristic in the region of thruster operation. Switch 28 allows the optional use of the adjustable arc voltage grain amplifier 36 to provide a modified power supply output characterization that may be useful for certain arcjets.

Alternate embodiments of more exotic static and dynamic output characteristics may be realized by replacing the adjustable gain arc voltage amplifier 36 with active filters and function generators. The feedback signal could then make the output characteristic a variety of functions of arc voltages, current, and time. The arc voltage signal could be used to determine whether arc voltage is out of tolerance by using low voltage mode detector 38. Then out of tolerance conditions can be corrected by other means if necessary.

Moreover, alternative emodiments of the PWM current regulated converter 12 may be used for potential higher powsr demand. For example, for high voltage (greater than 100 V) spacecraft buses, a bridge converter instead of the parallel converter of the present invention may be used. This change would better utilize semiconductor switch capabilities and result in a simplier and lighter power transformer.

While the invention has been described with reference to certain preferred embodiments thereof, those skilled in the art will appreciate that various modifications, changes, omissions and substitutions may be made without departing from the spirit of the invention. It is intended, therefore, that the invention be limited only by the scope of the following.

I claim:

1. A dc power supply for an arcjet thruster having a regulated, constant current output, and comprising:
   (a) a pulse width modulated (PWM) converter;
   (b) means for controlling the pulse widths of the PWM converter to maintain current supplied to the thruster at a virtual constant value despite instantaneous changes in the thruster voltage; and,
   (c) an output current averaging inductor connected between said converter and said arcjet thruster to enable instantaneous current control, a high voltage ignition pulse, and a galvanically isolated voltage signal proportional to said arcjet thruster voltage.

2. A power supply as claimed in claim 1 wherein said output current averaging inductor comprises:
   (a) a magnetic core having a primary winding adapted to provide virtual constant current to said arcjet thruster;
   (b) a secondary winding on said core galvanically isolated from said primary winding to enable impulse breakdown for arcjet startup; and,
   (c) a tertiary winding on said core galvanically isolated from said primary and said secondary windings to provide a signal voltage.

3. A power supply as claimed in claim 2 wherein said tertiary winding is serially connected with a resistor and a signal diode to enable a galvanically isolated voltage signal proportional to said arcjet thruster voltage.

4. A power supply as claimed in claim 1 further comprising means for starting said arcjet thruster.

5. A power supply as claimed in claim 3 wherein said resistor is about a 2,000 ohm resistor.

6. A power supply as claimed in claim 3 wherein said diode is a signal level blocking diode.

* * * * *